ABSTRACT

United States Patent [19]
de Laage de Meux et al.

[11] 4,059,805
[45] Nov. 22, 1977

[54] PHASE LOCK LOOP CARRIER GENERATOR FOR RECEIVER OF PHASE MODULATED CARRIER PULSE SIGNALS

[75] Inventors: Patrick M. de Laage de Meux, St. Germain-en-Laye; Michel J. Maitre, Conflans-Sainte-Honorine, both of France

[73] Assignee: Lignes Telegraphiques et Telephoniques, Paris, France

[21] Appl. No.: 764,543

[22] Filed: Feb. 1, 1977

[30] Foreign Application Priority Data

Feb. 3, 1976 France .................. 76.02867

[51] Int. Cl.² .................. H03D 3/02; H03K 9/04
[52] U.S. Cl. .................. 329/50; 325/346; 329/107; 329/122
[58] Field of Search .................. 329/104, 50, 105, 107, 329/110, 122, 124, 125; 331/1 A, 23, 25; 325/346, 419

[56] References Cited

U.S. PATENT DOCUMENTS

| | | | |
|---|---|---|---|
| 3,747,003 | 7/1973 | Siglow | 329/104 |
| 3,886,462 | 5/1975 | Okano et al. | 329/104 |

*Primary Examiner* — Siegfried H. Grimm

[57] ABSTRACT

Demodulator for phase modulated carrier pulse signals or phase codes in which the pulses are coded according to a plurality of N phases of the carrier. It comprises a digital phase lock loop system for locking to a frequency equal to N times the carrier frequency which includes at least a two input phase detector, a loop integrator and a voltage controlled oscillator having an output connected to the first input of the phase detector, means for dividing by N the frequency of this oscillator and for generating a reference carrier signal. The phase codes are decoded by comparing the phases of the carrier of the phase codes to the phase of the reference signal. In order to derive from all the phase codes a train of synchronous pulses a multiphase shifter receives the carrier of the phase codes and locally generates a plurality of carriers having phase shifts equal to 0, $2\pi/N$, $2 \times 2\pi/N$, ... $([N/2] - 1) \times 2\pi/N$ with respect to the carrier of the received phase code and means are provided for generating passing through zero pulses coinciding with the passage through zero of said received and locally generated carriers. Those of said passing through zero pulses which occur during the central part of each phase modulated carrier pulse are gated through gating means. These gated passing through zero pulses are applied to the second input of the phase detector.

5 Claims, 6 Drawing Figures

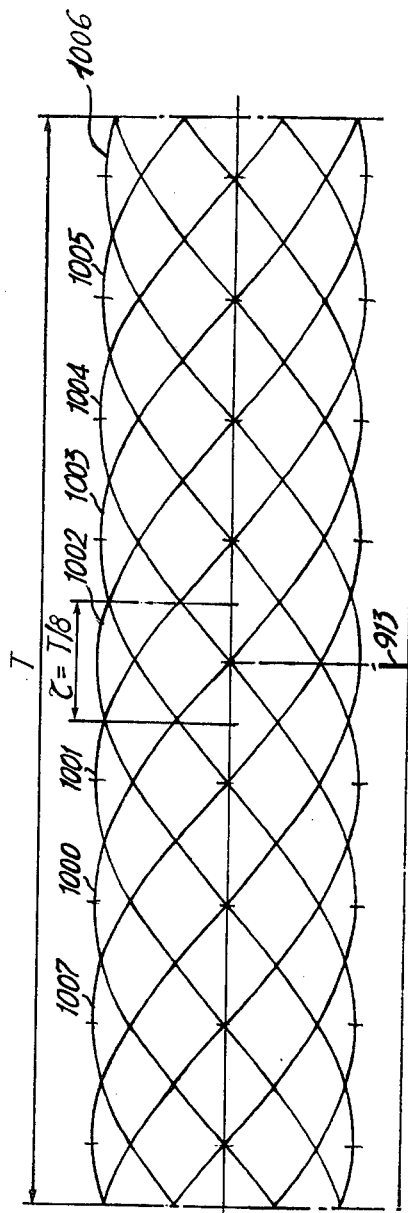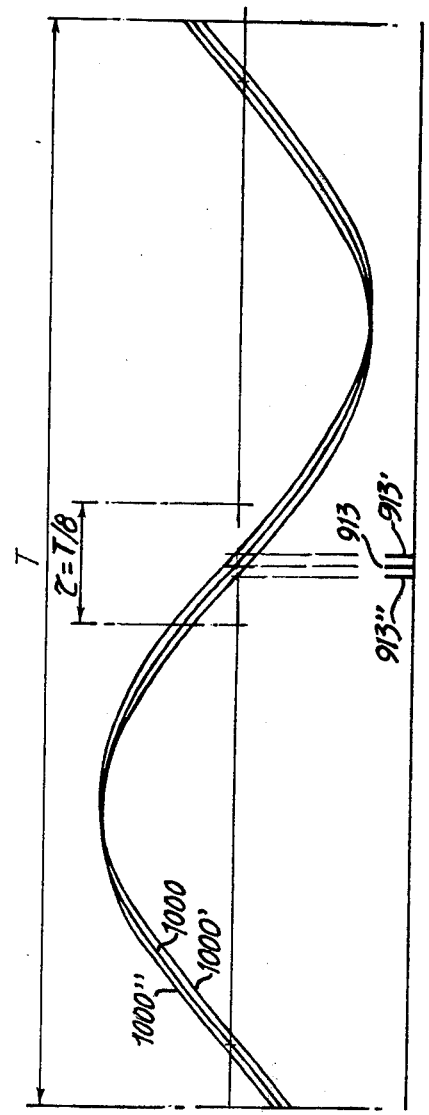

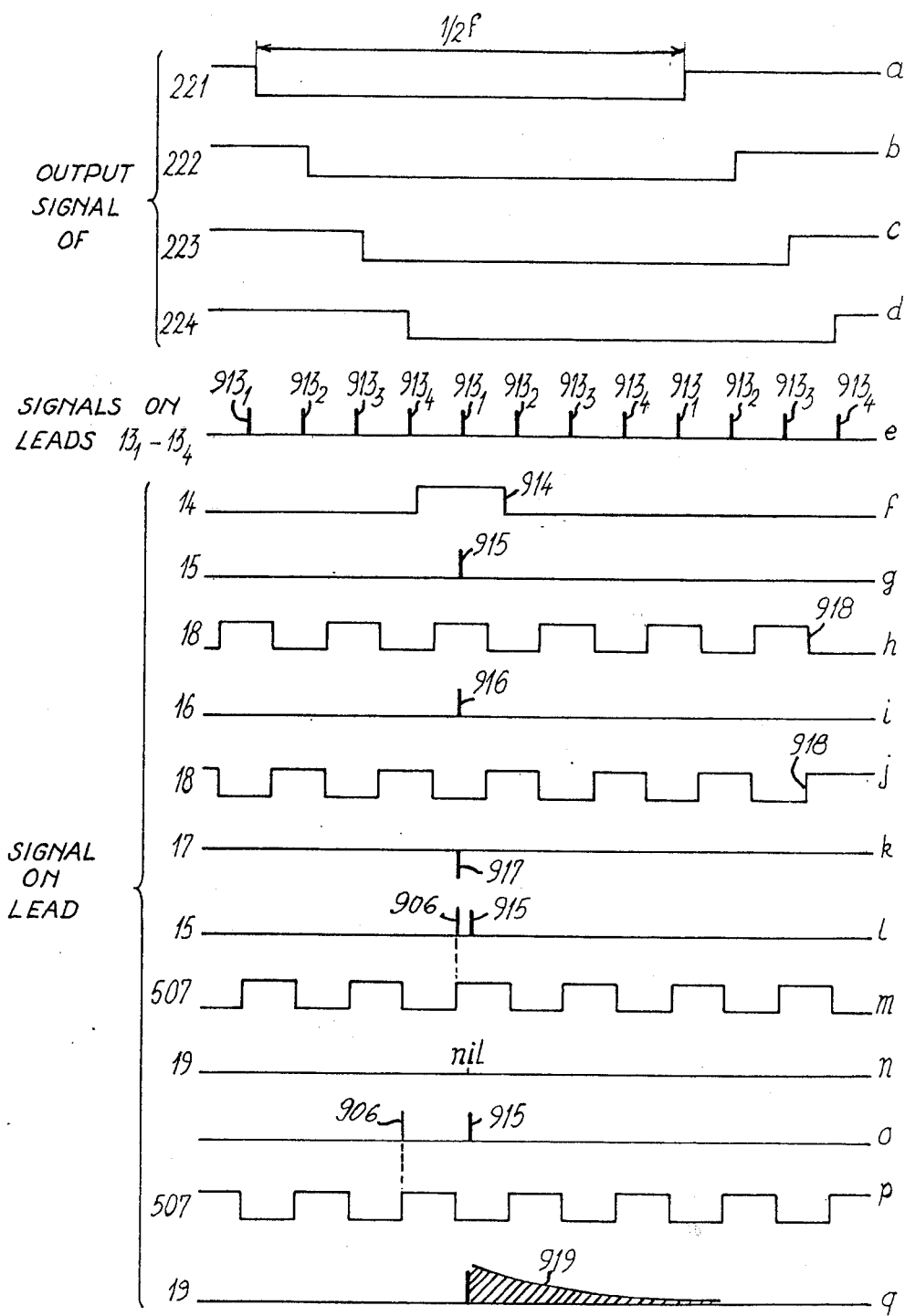

PHASE LOCK LOOP CARRIER GENERATOR FOR RECEIVER OF PHASE MODULATED CARRIER PULSE SIGNALS

BACKGROUND OF THE INVENTION

1. Field of the Invention

The present invention generally concerns a demodulator of phase modulated carrier pulse signals of the phase lock loop type.

In data transmission systems of the kind concerned by the invention, the digital signals transmitted by the system are represented by N significant values or codes of the phase of the carrier of pulses of said carrier having a given width, the said phase values being those of the carrier at a given time within said width with respect to a reference signal of the same frequency as the transmitted carrier. For fixing one's idea, for a transmission rate of 1600 bauds, the carrier pulses have a duration of $10^6/1600 = 625$ $\mu$s and the frequency $f$ of the carrier is 1800 Hz, whence $1/f = 555$ $\mu$s. Since the code is a N-ary code, the N distinct signals of the code can be respectively assigned to N characters or to group of $n$ bits with $2^n = N$.

Let us assume for instance that $N = 8$, whence $n = 3$; the allotment of the phase codes to the bit groups can be the following:

| | | | |
|---|---|---|---|
| $\phi_0 = 0$ | 0 0 0 | $\phi_4 = \pi/2$ | 1 0 0 |
| $\phi_1 = \pi/4$ | 0 0 1 | $\phi_5 = 5\pi/4$ | 1 0 1 |
| $\phi_2 = \pi/2$ | 0 1 0 | $\phi_6 = 3\pi/2$ | 1 1 0 |
| $\phi_3 = 3\pi/4$ | 0 1 1 | $\phi_7 = 7\pi/4$ | 1 1 1 |

More precisely, this phase modulated carrier pulse system is operated as a differential system, i.e. a given character is not represented by a determined phase but by the phase shift between the phase code assigned to the character and the phase code assigned to the preceding character. Otherwise speaking, only phase differences or shifts are transmitted.

For decoding the phase codes, it is necessary to reconstitute the reference carrier from the randomly occuring phase codes. This is not directly possible and in fact a multiplied reference signal having a frequency equal to N times the carrier frequency is first reconstituted then this multiplied reference signal is divided by N. Once the reference carrier has been reconstituted, decoding consists in comparing the phase of the carrier in each pulse to the phase of the reconstituted carrier.

The principal object of the present invention is to provide an improved phase lock loop system for reconstituting the carrier frequency in phase modulated carrier pulse transmission systems.

Another object of the invention is to provide a phase lock loop system for reconstituting the carrier frequency in phase modulated carrier pulse transmission systems which has a very high speed of loop lock up. To fix one's idea, the loop transient settling time is of the order of 10 milliseconds.

2. Description of the Prior Art

The simplest way for reconstituting the carrier frequency is to multiply the carrier in each pulse by N, then to apply the multiplied frequency signals to the phase detector of a phase lock loop system comprising a low-pass filter, an integrator and a voltage controlled oscillator controlled by said low-pass filter and whose output is fed back to the second input of the phase detector and which also supplies the output multiplied reference signal.

A phase lock loop digital circuit which provides a very high speed of loop lock up while maintaining optimum loop bandwidth during the steady state lock up operation is disclosed in U.S. Pat. No. 3,795,870 issued Mar. 5, 1974. This phase lock loop circuit employs a frequency/phase detector circuit which operates in the frequency detector mode when the loop is unlocked to control a speed up circuit to slew a local oscillator to the lock condition in a time order of magnitude faster than with standard forms of phase detectors. The frequency phase detector thereafter functions in the phase detector mode to maintain the loop in the steady-state lock conditions. When the speed up circuit brings the loop to the locked condition, the bandwidth of the phase lock loop is at a high value to provide a fast loop transient settling time. At the time the locked loop settles into its steady state condition, the loop bandwidth is lowered to the optimum value for good noise performance.

Such a phase lock loop circuit cannot be used in phase modulated carrier pulse signal transmission systems since it assumes that synchronous pulses having precise repetition frequency can be derived from the signals whose phases or frequencies have to be compared. This can readily be done for the reference signal by selecting as VCO a variable frequency pulse generator. But as regards to the phase modulated carrier pulse input signal, since in each pulse, the instants of passage through zero of the carrier randomly vary within the pulse width, it is not possible to derive from the passing through zero instants a train of synchronous pulses.

Further during transmission, the signal in base band may be frequency transposed in modulators and demodulators and it may arise than the two frequency transpositions do not result in the reconstitution of the same base band carrier frequency. The carrier frequency may thus deviate by several Hertz from its nominal value. Finally, phase jumps of the carrier occur when passing from one pulse to the following. From these two grounds, there results a jig (that is a certain amount of filter) of the passing through zero instants.

SUMMARY OF THE PRESENT INVENTION

The present invention provides a demodulator of phase modulated carrier pulses which comprises a phase lock loop system formed of a phase detector, a loop integrator and a voltage controlled oscillator in which the phase detector receives recurrent pulses derived from the phase modulated carrier pulses and recurrent pulses supplied by the voltage controlled oscillator and the loop integrator is controlled by a gain and loop transient time control circuit allowing the loop integrator to have two values of integration constant.

The recurrent pulses derived from the input phase modulated carrier pulses are obtained by applying these carrier pulses to a multiphase shifter and passing through zero pulse generator circuit. This circuit comprises a multiphase shifter which shifts the phase of the carrier of the input pulse by $0, 2\pi/N, 2 \times 2\pi/N, \ldots ([N/2]-1) \times 2\pi/N$ and a passing through zero pulse generator generating pulses coinciding with the instants when the carrier of the pulses reaches a zero value. These "passing through zero" pulses are gated by "window" pulses coinciding with the central portion of the phase modulated carrier pulses and the gated pulses are applied to the phase detector of the phase lock loop circuit. It results that all the phase modulated carrier pulses give rise to at least a passing through zero pulse while only some of the phase modulated carrier pulses, those having a carrier zero near the middle of the pulse, would have generated a passing through zero pulse if the multiphase shifter were omitted.

It is to be noted that in multiphase shifter 2, the carrier undergoes discrete phase shift increments discretely varying by multiples of $2\pi/N$ from 0 times $2\pi/N$ to $([N/2]-1)$ times $2\pi/N$ and not from 0 times $2\pi/N$ to $(N-1)$ times $2\pi/N$. The reason for this is that the signals $\sin[\omega t - k \times 2\pi/N]$ and $\sin[\omega t + (N-k) \times 2\pi/N]$ have the same zeros.

BRIEF DESCRIPTION OF THE DRAWINGS

The invention is diagrammatically illustrated by way of example in the drawings appended hereto in which:

FIGS. 4, 5 and 6 show signal waveforms appearing at predetermined points of the phase lock loop system.

DESCRIPTION OF THE PREFERRED EMBODIMENT

Referring first to FIG. 4, there is shown a time slot of width T including a little more than a cycle of an A.C. carrier signal 1000 of frequency $f$. It is assumed that T = 625 $\mu$s and $1/f$ = 555 $\mu$s. Carrier 1000 has phase zero. Carriers 1001 to 1007 have phases equal respectively to $2\pi/8$, $2 \times 2\pi/8$, $3 \times 2\pi/8$, ... $7 \times 2\pi/8$. Assuming that the window pulses have a width $\tau$ = T/8, only the signals:

1000 $\sin\omega t$
1004 $\sin(\omega t - 4 \times 2\pi/8)$ have zeros located within the width of the window pulse and give rise to a passing through zero pulse 913.

If the phase codes are distributed at random only one phase modulated carrier code contributes to loop locking and thereby the loop transient time is rather long.

The multiphase-shifter generates three additional phase shifted carriers from any carrier. It associates carriers 1001, 1002 and 1003 to carrier 1000, carriers 1002, 1003 and 1004 to carrier 1001, ... carriers 1000, 1001 and 1002 to carrier 1007. The result is that whatever be the phase code, it corresponds thereto a passing through zero pulse 913 within the window pulse, this passing through zero pulse being produced either by the carrier pulse itself or by one of its associated multiphased carrier pulses. The loop transient is thus shortened.

FIG. 5 shows how the carrier signal is distorted due to variations of the carrier frequency $f$ and phase jumps between two adjacent phase modulated carrier pulses. The carrier 1000 is located between two limits 1000' and 1000" which results in a jig of pulse 913 whose occurrence time varies between 913' and 913".

Figure 1:
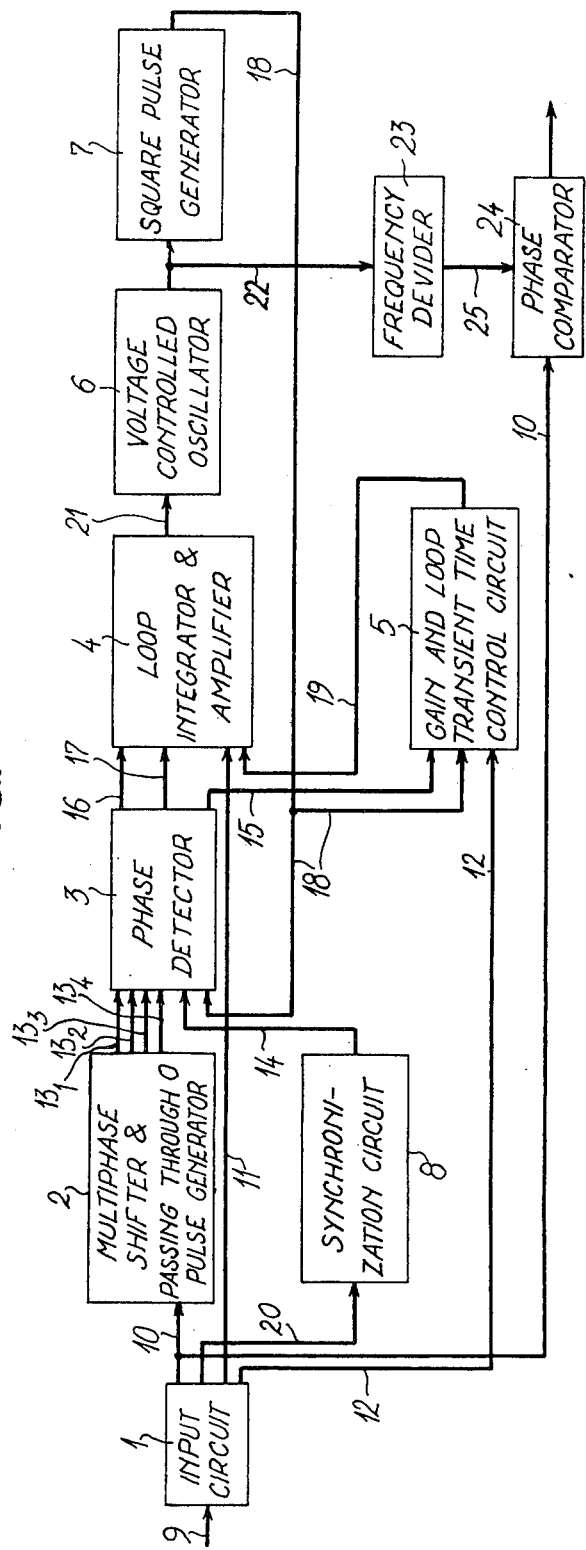
FIG. 1 represents in block diagram form the phase lock loop system of the invention.

Turning now to FIG. 1, the phase modulated carrier pulses enter, through line 9, input circuit 1 where they are filtered, detected in a peak detector and compared to a threshold in a threshold circuit. The filtered pulses are applied to multiphase shifter and passing through zero pulse generator 2 via lead 10 and the filtered and detected pulses are applied to loop integrator and amplifier circuit 4 via lead 11, gain and loop transient time control circuit 5 via lead 12 and synchronization circuit 8 via lead 20. Synchronization circuit 8 generates on lead 14 window pulses 914 (see FIG. 6) which are centered on the middle of the phase modulated carrier pulses and have a width comprised between T/4 and T/8 in the case where N = 8.

Multiphase shifter and passing through zero pulse generator 2 generates, starting from a received carrier pulse whose carrier has a given phase code, three multiphased carriers having the same phase code respectively incremented by $2\pi/8$, $2 \times 2\pi/8$ and $3 \times 2\pi/8$. It also generates brief pulses coinciding with the zero of the received carrier and the zeros of the locally generated multiphased carriers. The passing through zero pulses $913_1-913_4$ are applied through leads $13_1-13_4$ to phase detector 3.

Phase detector 3 also receives via lead 14 the window pulses 914 and via lead 18 a square pulse train 918 generated by a square pulse generator 7. One of the passing through zero pulses $913_1-913_4$ is gated by window pulse 914 and the gated passing through zero pulse 915 is inverted (pulse 917) or not (pulse 916) according to whether the instant of occurrence of the pulse coincides with a low or a high of square pulse train 918. The positive control pulses 916 are applied to loop integrator and amplifier circuit 4 via lead 16 and the negative control pulses 917 are applied thereto via lead 17.

The gain and loop transient time control circuit 5 receives the input detected phase modulated carrier pulses via lead 12, the square pulse train 918 via lead 18 and the gated passing through zero pulses 915 via lead 15. It comprises means for shifting by $\pi/2$ the phase of the square pulse train 918, means for gating by this phase shifted square pulse train the pulses 915 and means for integrating these gated pulses in order to generate a d.c. voltage 919 for controlling, via lead 19, the loop integrator and amplifier 4. It is thus seen that when the interval between clock pulses 906 and control pulses 915 is larger than the half period of pulses 906, a limited d.c. voltage 919 is generated for controlling integrator and amplifier 4.

The loop integrator and amplifier 4 receives the positive control pulses 916 or the negative control pulses 917 and the d.c. voltage 919. It is essentially an operational amplifier arranged as an integrator in which the feedback loop capacitor is varied by means of a field effect transistor controlled by d.c. voltage 919.

The output signal of loop integrator and amplifier 4 is applied via lead 21 to voltage controlled oscillator 6. VCO 6 controls the square pulse generator 7 and it is also connected, via lead 22, to "divide by N" counter 23.

The phase decoder is merely a phase comparator 24 which receives, via lead 10, the input pulses and, via lead 25, the clock signal at frequency $f$.

Circuits 1, 2, 3, 4 and 5 will now be described in relation to schematic diagrams. Circuits 6, 7, 8 and 24 are of conventional design and do not need any further development.

Figure 2:
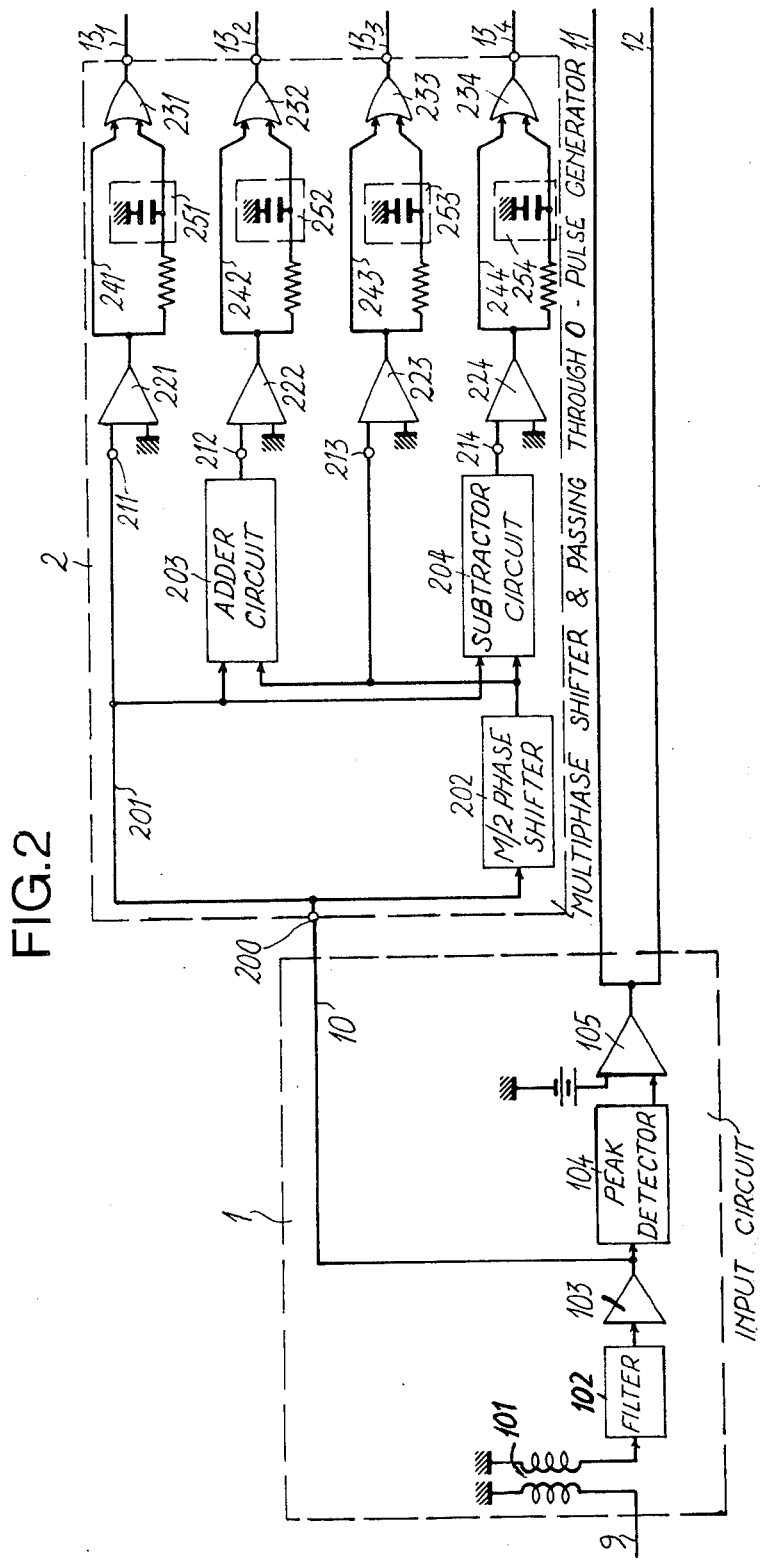
FIG. 2 represents in a more detailed manner the input circuit and the multiphase-shifter and passing through zero pulse generator included in the phase lock loop system of FIG. 1.

Turning now to FIG. 2, the input circuit 1 comprises a transformer 101 whose primary winding is connected to the incoming line 9 and the secondary winding to a pass-band filter 102. This filter is connected to an amplifier 103 whose output is connected, via lead 10, to multiphase shifter and passing through zero pulse generator 2 and to a peak detector 104 and a comparator 105 acting as a threshold circuit. The output of comparator 105 is connected, via leads 11 and 12, to loop integrator and amplifier circuit 4 and gain and loop transient time control circuit 5 respectively.

The multiphase shifter and passing through zero pulse generator 2 has one input terminal 200 connected to input circuit 1 via lead 10 and four output terminals 211-214 connected to the input terminal 200 through four paths including phase shift circuits having respective phase shifts 0, $\pi/4$, $\pi/2$, $3\pi/4$. Various diagrams for designing circuits of this type are known in the art and FIG. 2 shows the circuit used in the preferred embodiment. It comprises in path 200-211 a lead 201, in path 200-213 a $\pi/2$ phase shifter 202, in path 200-212 an adder circuit 203 and in path 200-214 the $\pi/2$ phase shifter 202 plus a subtractor circuit 204. As $(\cos\omega t \pm \sin\omega t) = \sqrt{2} \sin(\omega t \pm \pi/4)$, the signals at output terminals 211-214 have the indicated respective phase shifts.

The passing through zero pulse generator included in multiphase shifter and passing through zero pulse generator 2 generates brief pulses at the times when the output signals of the multiphase shifter pass through zero. It comprises zero detectors 221-224 which are operational amplifiers having first inputs respectively connected to terminals 211-214 and second inputs all connected to ground. The outputs of operational amplifiers 221-224 are connected to exclusive OR gates, respectively 231-234, on the one hand directly through leads 241-244 and, on the other hand, through delay circuits 251-254. This produces pulses $913_1$ to $913_4$ (see FIG. 6) on the outputs leads $13_1$ to $13_4$ whose width depends on the delay of delay circuits 251-254.

Figure 3:
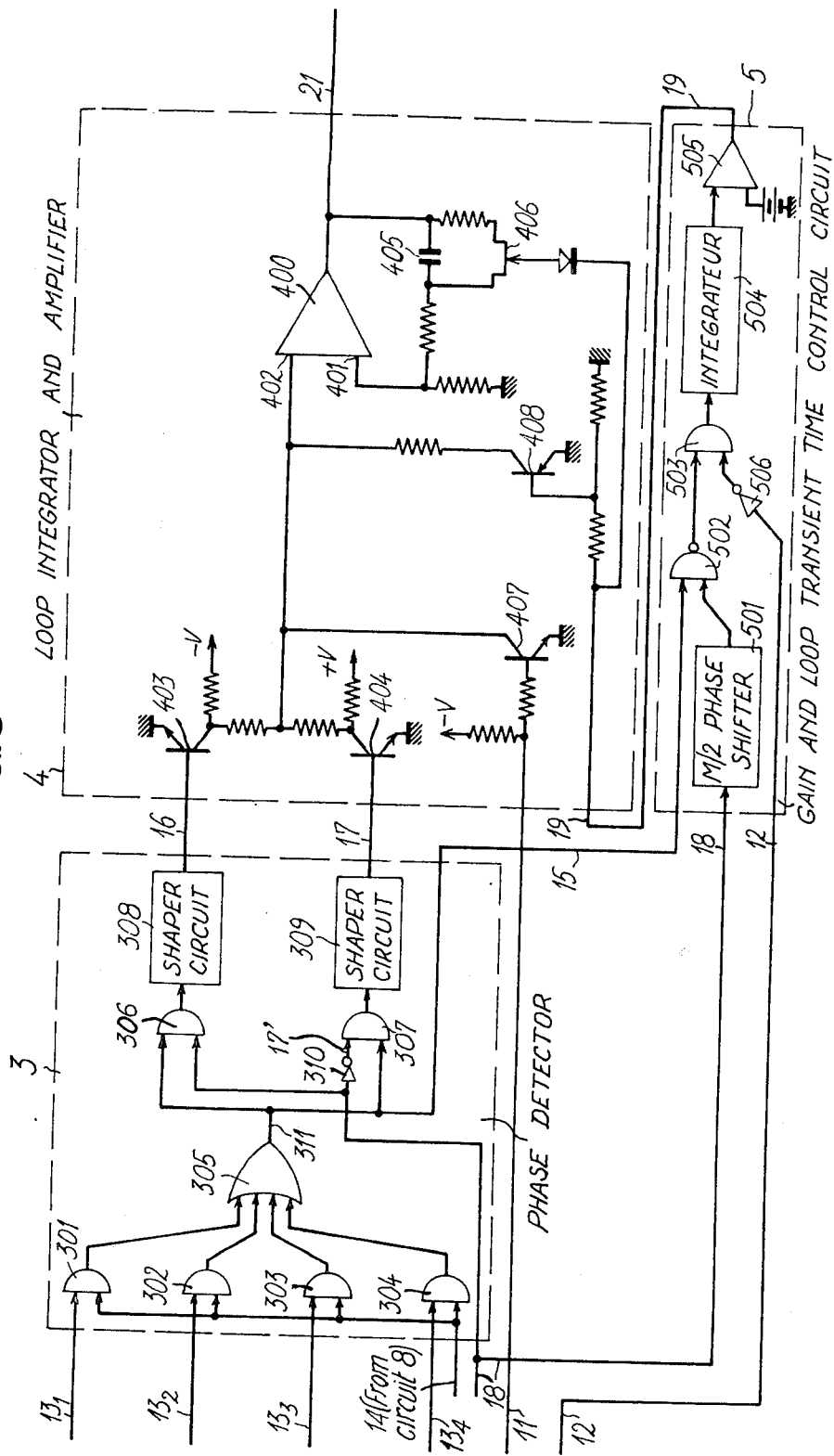
FIG. 3 represents in a more detailed manner the phase-detector, loop integrator and amplifier and gain and loop transient time control circuit included in the phase lock loop system of FIG. 1.

Referring now to FIG. 3, phase detector 3 receives the input signal multiphased in multiphase shifter and passing through zero pulse generator 2 and the output signal of square pulse generator 7. It comprises four AND gates 301-304 having an input connected respectively to leads $13_1$-$13_4$ and another input connected to synchronization circuit 8, via lead 14. Lead 14 conveys pulses defining a window of duration $\tau = T/8$ centered on the middle of the time slots T. The output signals of gates 301-304 are applied to an OR gate 305, whose output signal is applied, via lead 15, to gain and loop transient time control circuit 5 and, via AND gates 306 and 307, to shaper circuits 308 and 309. AND gates 306-307 are controlled by square pulse generator 7 through lead 18 directly as regards to AND gate 306, through inverter 310 as regards to AND gate 307. The outputs of shaper circuits 308 and 309 are connected to loop integrator and amplifier circuit 4 through leads 16 and 17.

FIG. 6 shows the window pulse 914 on lead 14, the passing through zero pulses $913_1$-$913_4$ on leads $13_1$-$13_4$ and the square pulses 918 on lead 18. It is assumed that the output pulse of OR gate 305 is pulse 915 corresponding to pulse $13_1$. When pulse 915 coincides with a high of signal 918, it gives rise to a positive pulse 916, on lead 16; when pulse 915 coincides with a low of signal 918, it gives rise, through gate 307, to a negative pulse 917 on lead 17.

Gain and loop transient time control circuit 5 comprises a phase shifter 501, two cascaded AND gates 502 and 503, an integrator 504 and a comparator 505 acting as a limiting circuit. The second input of AND gate 502 is connected to lead 15 originating from phase detector 3 and the second input of AND gate 503 is connected to lead 12 originating from input circuit 1 via inverter 506. One sees that when the control pulse 915 coincides with a high of square pulse train 918 phase shifted by $\pi/2$ (i.e. when the control pulse 915 is spaced apart from the leading edge of a pulse of pulse train 918 by less than the quarter of the period of pulse train 918), pulse 915 is blocked by gate 502. When the control pulse 915 coincides with a low of square pulse train 918, it is allowed to pass through gate 502 and is integrated by integrator 504. The d.c. signal 919 thus formed is applied to loop integrator and amplifier circuit 4.

The loop integrator and amplifier circuit 4 is shown in FIG. 3. It comprises an operational amplifier 400 arranged as an integrator circuit by means of a feedback loop from its output to its non-inverting input 401, including capacitor 405 bridged by a field effect transistor 406. This field effect transistor is controlled by the gain and loop transient time control circuit 5 via lead 19.

The positive and negative control pulses 916 and 917 are amplified by respective transistors 403 and 404. An additional transistor 408 varies the potential of inverting input 402 depending on signal 919. It results that signal 919 changes at the same time the gain of amplifier 400 and the time constant of the integrator.

Transistor 407 controlled by the part of the detected input pulses which exceeds the threshold of threshold circuit 105, through lead 11, short-circuits amplifier input 402 when the amplitude of the input phase modulated carrier pulse signals is below the threshold.

FIG. 6 was explained as the disclosure goes along. It is now summarized.

Lines $a, b, c, d$ represent respectively the output signals of comparators 221-224. Line $e$ represents the passing through zero pulses $913_1$-$913_4$. As explained hereinabove, these four pulses are always present at the inputs of gate 305 whatever be the phase code of the presently received phase modulated carrier pulse. Line $f$ represents the window signal 14, and line $g$ the control pulse 915 resulting from the gating of pulse $913_1$ by window pulse 914. Lines $h$ and $j$ show the square pulse train 918 generated by generator 7 according to two phase conditions in opposition to each other. Lines $g, h, i$ show that pulse 915 is converted to a positive pulse 916 when it coincides with a high of signal 918 and lines $g, j, k$ show that pulse 915 is converted to a negative pulse 917 when it coincides with a low of signal 918. Lines $m$ and $p$ show the square pulse train 918 phase shifted by an angle of $\pi/2$ by means of phase-shifter 501 according to two phase conditions in opposition to each other. Finally, lines $l, m, n$ show that when control pulse 915 coincides with a high of phase shifted pulse train 918 it is blocked and does not give rise to anything and that when it coincides with a low of said train, it is converted to a pulse which is integrated as represented by signal waveform 919.

While the present invention has been particularly set forth in terms of a specific preferred embodiment thereof, it will be understood that numerous variations are enabled to those skilled in the art which variations yet reside within the scope and spirit of the claims now appended hereto. Particularly, N may take values different from 8 and the width of the window pulse can be so selected as to allow more than one central passing through zero pulse to be converted to control pulses.

It was assumed in the specific embodiment described above that T = 625 μs and 1/f = 555 μs whence T = 1.125/f. In practice, T can vary between 1/f and 1.25/f.

What we claim is:

1. A demodulator of phase modulated carrier pulse signals in which the pulses are coded according to a plurality of N phases of the carrier, comprising a digital phase lock loop system for locking to a frequency equal to N times the carrier frequency, said phase lock loop system including at least a phase detector, a loop integrator fed from said phase detector and itself controlling a voltage controlled oscillator having an output connected to said phase detector, means for dividing by N the frequency of said oscillator and for generating a reference carrier signal, a phase comparator for comparing the phase of the carrier of said phase modulated carrier pulse signals to the phase of said reference carrier signal and for delivering a decoded signal depending on the comparison of the two latter phases, a multiphase shifter receiving the carrier of said phase modulated carrier pulse signals and locally generating a plurality of carriers having phase shifts equal to 0, $2\pi/N$, $2 \times 2\pi/N$, ... $([N/2]-1) \times 2\pi/N$ with respect to said received carrier, means for generating passing through zero pulses coinciding with the passage through zero of said received and locally generated carriers, means for gating those of said passing through zero pulses which occur during the central part of each phase modulated carrier pulse and means for applying to said phase detector said gated passing through zero pulses.

2. A demodulator of phase modulated carrier pulse signals according to claim 1, in which said phase modulated carrier pulse signals have a width T and the carrier has a period 1/f, T being comprised between 1/f and 1.25/f.

3. A demodulator of phase modulated carrier pulse signals according to claim 1, in which the means for gating those of said passing through zero pulses which occur during the central part of each phase modulated carrier pulse consists in a generator of window pulses having a width comprised between the Nth and $(N/2)^{th}$ of the width of the phase modulated carrier pulses and in gates receiving said passing through zero pulses and said window pulses.

4. A demodulator of phase modulated carrier pulse signals in which the pulses are coded according to a plurality of N phases of the carrier, comprising:

a digital phase lock loop system for locking to a frequency equal to N times the carrier frequency, said phase lock loop system including at least a phase detector, a loop integrator fed from said phase detector and itself controlling a voltage controlled oscillator, and a square pulse train generator controlled by said voltage controlled oscillator and having an output connected to said phase detector;

means for dividing by N the frequency of said oscillator and generating a reference carrier signal;

phase comparator means for comparing the phase of the carrier of said phase modulated carrier pulse signals to the phase of said reference carrier signal and delivering a decoded signal depending on the comparison of the two latter phases;

a multiphase shifter receiving the carrier of said phase modulated carrier pulse signals and locally generating a plurality of carriers having phase shifts equal to 0, $2\pi/N$, $2 \times 2\pi/N$, ... $([N/2] - 1) \times 2\pi/N$ with respect to said received carrier;

means for generating passing through zero pulses coinciding with the passage through zero of said received and locally generated carriers;

means for gating those of said passing through zero pulses which occur during the central part of each phase modulated carrier pulse; and means for converting in said phase detector the said gated passing through zero pulses to positive control pulses when they occur during a high of said square pulse train and to negative control pulses when they occur during a low of said square pulse train, said positive and negative control pulses acting on said voltage controlled oscillator.

5. A demodulator of phase modulated carrier pulse signals in which the pulses are coded according to a plurality of N phases of the carrier, comprising:

a digital phase lock loop system for locking to a frequency equal to N times the carrier frequency, said phase lock loop system including at least a phase detector, a loop integrator, fed from said phase detector and itself controlling a voltage controlled oscillator, and a square pulse train generator controlled by said voltage controlled oscillator and having an output connected to said phase detector;

means for dividing by N the frequency of said oscillator and generating a reference carrier signal;

phase comparator for comparing the phase of the carrier of said phase modulated carrier pulse signals to the phase of said reference carrier signal and delivering a decoded signal depending on the comparison of the two latter phases;

a multiphase shifter receiving the carrier of said pulse modulated carrier pulse signals and locally generating a plurality of carriers having phase shifts equal to 0, $2\pi/N$, $2 \times 2\pi/N$, ... $([N/2] - 1) \times 2\pi/N$ with respect to said received carrier;

means for generating passing through zero pulses coinciding with the passage through zero of said received and locally generated carriers;

means for gating those of said passing through zero pulses which occur during the central part of each phase modulated carrier pulse;

means for converting in said phase detector the said gated passing through zero pulses to positive control pulses when they occur during a high of said square pulse train and to negative control pulses when they occur during a low of said square pulse train, said positive and negative control pulses acting on said voltage controlled oscillator;

means for phase shifting by $\pi/2$ said square pulse train; and a control circuit for controlling the phase lock loop circuit integrator by making it operative or not, said control circuit receiving said gated passing through zero pulses and said phase shifted square pulse train and generating a control signal when said gated passing through zero pulses occur during a low of said phase shifted square pulse train.

* * * * *